US 6,559,219 B2

(12) United States Patent
Tadaki et al.

(10) Patent No.: US 6,559,219 B2
(45) Date of Patent: May 6, 2003

(54) RUBBER COMPOSITIONS

(75) Inventors: Toshihiro Tadaki, Tokyo (JP);
Tomohisa Konno, Tokyo (JP);
Yoshiyuki Udagawa, Tokyo (JP);
Hiroshi Akema, Tokyo (JP)

(73) Assignee: JSR Corporation, Tokyo (JP)

( * ) Notice: Subject to any disclaimer, the term of this patent is extended or adjusted under 35 U.S.C. 154(b) by 209 days.

(21) Appl. No.: 09/842,806

(22) Filed: Apr. 27, 2001

(65) Prior Publication Data

US 2003/0008954 A1 Jan. 9, 2003

(30) Foreign Application Priority Data

Apr. 27, 2000 (JP) .......................................... 2000-128144

(51) Int. Cl.$^7$ ................................................. C08K 3/04
(52) U.S. Cl. ........................ 524/495; 524/496; 524/261; 525/84; 525/261; 252/511
(58) Field of Search ................................ 524/495, 496, 524/261; 525/84, 228; 252/511; 492/56

(56) References Cited

U.S. PATENT DOCUMENTS

| 4,728,692 A | * | 3/1988 | Sezaki et al. .................. 525/74 |
| 5,733,977 A | * | 3/1998 | Takemura et al. ........... 525/105 |
| 6,191,234 B1 | | 2/2001 | Tadaki et al. ............. 525/332.9 |
| 6,207,723 B1 | * | 3/2001 | Matsushita et al. ............ 521/41 |

FOREIGN PATENT DOCUMENTS

| GB | 1078400 | 8/1967 |
| JP | 3-177444 | 8/1991 |
| JP | 9-208623 | 8/1997 |
| JP | 9-208633 | 8/1997 |
| JP | 10-204217 | 8/1998 |
| JP | 10-204225 | 8/1998 |
| JP | 2001-31798 | 2/2001 |
| WO | WO 96/23027 | 8/1996 |

OTHER PUBLICATIONS

U.S. patent application Ser. No. 09/412,592, filed Oct. 6, 1999, pending.
U.S. patent application Ser. No. 09/842,162, filed Apr. 26, 2001, pending.
U.S. patent application Ser. No. 09/940,503, filed Aug. 29, 2001, pending.
U.S. patent application Ser. No. 09/843,864, filed Apr. 30, 2001, pending.
U.S. patent application Ser. No. 09/940,895, filed Aug. 29, 2001, pending.
U.S. patent application Ser. No. 09/983,626, filed Oct. 25, 2001, pending.
U.S. patent application Ser. No. 09/986,900, filed Nov. 13, 2001, pending.
U.S. patent application Ser. No. 09/842,806, filed Apr. 27, 2001, pending.

* cited by examiner

Primary Examiner—David W. Wu
Assistant Examiner—Henry S Hu
(74) Attorney, Agent, or Firm—Oblon, Spivak, McClelland, Maier & Neustadt, P.C.

(57) ABSTRACT

A rubber composition of the invention comprises [1] a cross inked rubber particle component whose toluene-insolubles is 50% by weight or more and whose number mean particle size is 3 to 1000 nm and [2] a non-crosslinked rubber component whose toluene-insolubles is less than 20% by weight. This crosslinked rubber particle component is a polymer comprising at least one selected from (1) a conjugated diene unit, (2) a conjugated diene unit and an $\alpha,\beta$-unsaturated nitrile unit and (3) a conjugated diene unit and an acrylate unit as well as a monomer unit having at least 2 polymerizable unsaturated groups. The non-crosslinked rubber component described above is a polymer co rising at least one selected from (a) a conjugated diene unit, (b) (a) plus an aromatic vinyl unit, (c) (a) plus an $\alpha,\beta$-unsaturated nitrile unit, (d) (a) plus an acrylate unit and (e) an ethylene unit and an $\alpha$-olefin unit having 3 to 12 carbon atoms.

20 Claims, No Drawings

RUBBER COMPOSITIONS

BACKGROUND OF THE INVENTION

1. Field of the Invention

The present invention relates to a rubber composition comprising a crosslinked rubber particle component and a non-crosslinked rubber component as essential components. A rubber composition of the invention exhibits an excellent processability, and also exhibits excellent handling performance and dimension s and the like especially when combined with a silica as a reinforcing agent. A vulcanized rubber obtained by vulcanizing a rubber composition of the invention can be used in various industrial field as a rubber product such as a belt, a hose, a roll and a tire, and the like.

2. Description of the Related Art

A starting rubber which has been employed frequently for a rubber product may for example be:

(A) a polymer whose repeating unit consists only of a conjugated diene unit such as a butadiene rubber, an isoprene rubber, a chloroprene rubber and a natural rubber;

(B) a polymer whose repeating units are a conjugated diene unit and an aromatic vinyl unit such as a styrene-butadiene copolymeric rubber, a styrene-isoprene copolymeric rubber and a styrene-isoprene-butadiene copolymeric rubber;

(C) a polymer whose repeating us are a conjugated diene unit and an α,β-unsaturated nitrile unit such as an acrylonitrile-butadiene copolymeric rubber;

(D) a polymer in which an acrylate unit is essential as a repeating unit such as an acrylic rubber; and, (E) a polymer whose repeating units are ethylene and an α-olefin having 3 to 12 carbon atoms optionally with a non-conjugated polyene, such an ethylene-propylene rubber.

Any of these starting rubbers, when combined with a silica as a reinforcing agent, an provide a colored rubber product except for a black colored product, and a favorable performance of a formulated rubber made therefrom is a heat generation kept at a low level. However, unlike to a carbon black, a silica may lead to a problematic reduction in the tensile strength and the wearing resistance of a vulcanized rubber, and the like. Additional problems associated with the incorporation of a silica include ① a reduction in the processability and the compound consistency upon kneading, ② an insufficient smoothness of the surface of a sheet made from a compound using a roll and an irregular sheet edge accompanied with a substantial hrinkage upon cooling, and the like.

Such problems may be due an aggregation of a silica instead of a sufficient dispersion. A rubber composition in which a silica is not dispersed sufficiently poses a difficulty in obtaining a certain reinforcing effect of the incorporation of a reinforcing and undergoes a heat generation attributable to the interaction between poorly dispersed silica particles, resulting in a substantial reduction in the processability. Such poor dispersion of a silica occurs possibly because of the reasons that a silica has a high self-inter ting effect when compared with a carbon black and tends to aggregate easily and that a starting rubber usually consists of carbon and hydrogen and has a lower polarity when compared with a silica which leads to a low affinity with the silica.

For the purpose of increasing the affinity of a silica with a hydrocarbon-based rubber, the use of a conjugated diene-based rubber to which a functional group having an affinity with the silica is introduced has been investigated. For example, a conjugated diene-based rubber to which a hydroxyl group is introduced (WO96/23027), a conjugated diene-based rubber to which an alkoxysilyl group is introduced (JP-A 9-208623) and a conjugated diene-based rubber to which an alkoxysilyl group and an amino group or a hydroxyl group are introduced (JP-A 9-208633) have been proposed. However, such conjugated diene-based rubber to which a functional group described above is introduced mostly exhibits problematically poor dispersion, excessive heat generation upon processing and poor processability, and the like since it undergoes an extensive aggregation with a silica when the silica is admixed.

On the other hand, a silane coupling agent is incorporated usually for the purpose of preventing an aggregation of a silica and achieving a uniform dispersion. This results in an improvement in the dispersibility of a silica to some extent and a substantial improvement in the processability of a rubber composition and the tensile strength and the wearing resistance of a vulcanized rubber and the like. Nevertheless, the smoothness of the surface and the edge of a sheet or the problematic shrinkage of a sheet upon cooling or the like has not adequately been improved. Furthermore, a sufficient improvement in the processability, the tensile strength or the wearing strength or the like requires the incorporation of a silane coupling agent in an amount as high as about 8 to 15% by weight based on a silica, but such silane coupling agent is expensive and increases the cost for a rubber composition.

SUMMARY OF THE INVENTION

The present invention overcomes the problems experienced conventionally as described above, and is intended to provide a rubber composition having excellent processability and handling performance, which are experienced as a satisfactory processability upon kneading, a smooth sheet surface, a regular sheet edge and a less shrinkage upon cooling, and the like. A vulcanized rubber obtained by vulcanizing a rubber composition described above has excellent tensile strength and wearing resistance, and the like.

We made an effort to solve the problems mentioned above and discovered that by incorporating a crosslinked rubber particle component having a certain composition into a rubber composition, it is possible to obtain a rubber composition which exhibits a satisfactory processability upon kneading and achieves a satisfactory smoothness of the sheet surface and the sheet edge and a less sheet shrinkage upon cooling even when using a silica as a reinforcing agent. It was also discovered that by using this rubber composition it is possible to obtain a vulcanized rubber exhibiting a less heat generation and having sufficient tensile strength and wearing resistance, and the like. In addition, even when a silane coupling agent is used only in a reduced amount or is not used, the processability and the tensile strength, and the like were revealed to be improved sufficiently to the levels at which no practical problems are experienced.

According to the invention, a rubber composition having satisfactory processability and dimension stability, and the like can be obtained when using a silica as a reinforcing agent. In addition, a vulcanized rubber having excellent tensile strength and wearing resistance, and the like can also be obtained.

DETAILED DESCRIPTION OF THE INVENTION

A rubber composition of the invention comprises [1] a crosslinked rubber particle component whose toluene-insolubles is 50% by weight or more and whose number-average particle size is 3 to 1000 nm and [2] a non-crosslinked rubber component whose toluene-insolubles is less than 20% by weight, wherein said crosslinked rubber particle component is at least one selected from (1) a polymer comprising a conjugated diene unit and a monomer unit having at least two polymerizable unsaturated groups as repeating units, (2) a polymer comprising a conjugated diene unit, an α,β-unsaturated nitrile unit and a monomer unit having at least two polymerizable unsaturated groups as repeating units and (3) a polymer comprising a conjugated diene unit, an acrylate unit and a monomer unit having at least two polymerizable unsaturated groups as repeating units, and wherein said non-crosslinked rubber component is at least one selected from (a) a polymer comprising unit only a conjugated diene unit as repeating units, (b) a polymer comprising a conjugated diene unit and an aromatic vinyl unit as repeating units, (c) a polymer comprising a conjugated diene unit and an α,β-unsaturated nitrile unit as repeating units, (d) an acrylic rubber and (e) a polymer comprising an ethylene unit and an α-olefin unit having 3 to 12 carbon atoms as repeating units.

A "crosslinked rubber particle component" described above consists of either of (A) a monomer which forms a conjugated diene unit (hereinafter referred to as "Monomer ①"), (B) Monomer ① and a monomer which forms an α,β-unsaturated nitrile unit (hereinafter referred to as "Monomer ②") or (C) Monomer ① and a monomer which forms an acrylate unit (hereinafter referred to as "Monomer ③") as well as (D) a monomer which forms a monomer unit having at least two polymerizable unsaturated group (hereinafter referred to as "Monomer ④")

A crosslinked rubber particle component described above is a particle whose toluene-insolubles based on the solid content of the filtrate obtained by a filtration through a 100 mesh-sized wire mesh after immersing in 100 ml of toluene at room temperature for 24 hours is preferably 50% by weight or more, especially 80% by weight or more. The toluene-insolubles less than 50% by weight leads to an insufficient improvement in the processability. The number-average particle size determined using a laser particle size analysis system (OTSUKA DENSHI Co., Ltd., Model LPA-3100) is 3 to 1000 nm, preferably 10 to 500 nm, more preferably 30 to 100 nm. A particle size exceeding 1000 nm leads to an insufficient dispersion of the crosslinked rubber particle component in a rubber composition, resulting in a reduced processability. The particle size of this crosslinked rubber particle component, in the case of an emulsion polymerization, can be controlled by selecting the types and the amounts or the like of the emulsion and the electrolytes employed appropriately.

A crosslinked rubber particle component can be produced using Monomers ① to ④ and Monomers ⑤ and ⑥ described below with the monomers also described below optionally by an emulsion polymerization, a suspension polymerization and the like. Thus, a polymerization of Monomers ①, ② and ③ and Monomers ⑤ and ⑥ and the like in an aqueous medium, as is usual in a production of a rubber by an emulsion polymerization, is performed in the presence of Monomer ④ which has at least two polymerizable functional groups and to whose molecular chain a crosslinking structure can be introduced by a copolymerization, whereby producing a crosslinked rubber particle component which is a constituent of a rubber composition of the invention.

Monomer ① may for example be 1,3-butadiene, 2,3-dimethyl-1,3-butadiene, isoprene and chloroprene, and the like. Any of these Monomers ① may be used alone or in combination of two or more.

In a repeating unit of a cosslinked rubber particle, the unit of Monomer ① is present in an amount of 30 to 99.8% by weight, particularly 40 to 99.8% by weight. An amount of Monomer ① less than the lower limit specified above leads to a difficulty in improving the processability, resulting in a reduced tensile strength of a vulcanized rubber.

Monomer ② may for example be acrylonitrile, methacrylonitrile and derivatives thereof, with acrylonitrile being preferred. Any of these Monomers ② may be used alone or in combination of two or more.

In a repeating unit of a crosslinked rubber particle component, the unit of Monomer ② is present preferably in an amount of 69.99% by weight r less, particularly 64.99% by weight or less. An amount of Monomer ② exceeding the upper limit specified above may lead to an insufficient improvement in the kneading processability of a rubber composition, the smoothness sheet surface and edge, the sheet shrinkage upon cooling and the vulcanization performance, and the like.

Monomer ③ may for example be (1) Alkyl (meth) acrylates such as methyl (meth)acrylate, ethyl (meth) acrylate, n-propyl (me h)acrylate, iso-propyl (meth)acrylate, n-butyl (meth)acrylate, iso-butyl (meth)acrylate, pentyl (meth)acrylate, hexyl (meth)acrylate, heptyl (meth)acrylate, 2-ethylhexyl (meth)acrylate, octyl (meth) crylate, nonyl (meth)acrylate and decyl (meth)acrylate, and the like as well as (2) Alkoxyalkyl (meth)acrylates such as methoxymethyl (meth)acrylate, methoxyethyl (meth)acrylate, methoxypropy (meth)acrylate, ethoxymethyl (meth)acrylate, thoxyethyl (meth)acrylate, ethoxypropyl (meth)acrylate and butoxyethyl (meth)acrylate, and the like. Any of these Monomers ③ may be employed alone or in combination of two or more, and a combination of different types may also be used.

In a repeating unit of a crosslinked rubber particle, the unit of Monomer ③ is present preferably in an amount of 69.99% by weight or less, particularly 59.99% by weight or less. An amount of Monomer ③ exceeding the upper limit specified above may lead to an insufficient improvement in the kneading processability of a rubber composition, the smoothness of sheet surface and edge, the sheet shrinkage upon cooling and the vulcanization performance, and the like.

Monomer ④ may for example be ethylene glycol di(meth)acrylate, propylene glycol di(meth)acrylate, 1,4-butanediol di(meth)acrylate, 1,6-hexanediol di(meth) acrylate, trimethylolpropane di(meth)acrylate, trimethylolpropane tri(meth)a acrylate, pentaerythritol tri(meth) acrylate, pentaerythritol tetra(meth)acrylate, divinylbenzene, diisopropenylbenzene and trivinylbenzene, and the like. Any of these Monomers ④ may be used alone or in combination of two or ore.

In a repeating unit of a crosslinked rubber particle component, the unit consisting of Monomer ④ is present preferably in an amount of 0.01 to 10% by weight, particularly 0.1 to 10% by weight. An amount of Monomer ④ less than 0.01% by weight leads to an insufficiently raised crosslinking degree of the crosslinked rubber particle component, resulting in a difficulty in maintaining the particle shape during a processing, which lead in turn to a difficulty in improving the processability of a rubber composition. On the other hand, an amount exceeding 10% by weight leads also to a problematically reduced tensile strength of vulcanized rubber and the like.

A crosslinked rubber particle component may comprise, at least in its part, 0.1 to 30% by weight of a monomer unit having one polymerizable unsaturated group and at least one functional group selected from an amino group, a hydroxyl group, an epoxy group and a carboxylic group ($CO_2H$ and/or $C_2^-$) as a repeating unit. A monomer which forms this monomer unit is designated here as "Monomer ⑤".

Monomer ⑤ is preferably a monomer having a tertiary amino group and may for example be those listed below.

(a) Dialkylaminoalkyl (meth)acrylates such as dimethylaminomethyl (meth)acrylates diethylaminomethyl (meth)acrylate, 2-dimethylaminoethyl (meth)acrylate, 2-diethylaminoethyl (meth)acrylate, 2-dimethylaminoethyl (meth)acrylate, 2-diethylaminoethyl (meth)acrylate, 2-(di-n-propylamino)ethyl (meth)acrylate, 2-dimethylaminopropyl (meth)acrylate, 2-diethylaminopropyl (meth)acrylate, 2-(di-n-propylamino)propyl (meth)acrylate, 3-dimethylaminopropyl (meth)acrylate, 3-diethylaminopropyl (meth)acrylate and 3-(di-n-propylamino)propyl (meth)acrylate, and the like (b) N-dialkylaminoalkyl group-containing unsaturated amides such as N-dimethylaminomethyl (meth)acrylamide, N-diethylaminomethyl (meth)acrylamide, N-(2-dimethylaminoethyl) (meth)acrylamide, N-(2-diethylaminoethyl) (meth)acrylamide, N-(2-diethylaminopropyl) (meth)acrylamide, N-(3-dimethylaminopropyl) (meth)acrylamide and N-(3-diethylaminopropyl) (meth)acrylamide, (c) Tertiary amino group-containing vinyl aromatic compounds, such as N,N-dimethyl-p-aminostyrene, N,N-diethyl-p-aminostyrene, dimethyl(p-vinylbenzyl)amine, diethyl(p-vinylbenzyl)amine, dimethyl(p-vinylphenethyl)amine, diethyl[2-(p-vinylphenethyl)amine, dimethyl(p-vinylbenzyloxymetyl]amine, dimethyl-(p-vinylbenzyloxymethyl)amine, dimethyl [2-(p-vinylbenzyloxy)ethyl]amine, dimethyl-(p-vinylbenzyloxy)ethyl)amine, dimethyl [2-(p-vinylphenethyloxy)ethyl]amine, dimethyl-(p-vinylphenethyloxymethyl)amine, diethyl [2-(p-vinylphenethyloxy)ethyl]amine, 2-vinylpyridine, 3-vinylpyridine and 4-vinylpyridine, and the like.

Among these listed above, a dialkylaminoalkyl (meth)acrylate and a tertiary amino group-containing vinyl aromatic compound are preferred. Any of these amino group-containing monomers may be employed alone or in combination of two or more.

A hydroxyl group-containing monomer may for example be:

(a) Hydroxyalkyl (meth)acrylates such as 2-hydroxyethyl (meth)acrylates, 2-hydroxypropyl (meth)acrylates, 3-hydroxypropyl (meth)acrylate, 2-hydroxybutyl (meth)acrylates, 3-hydroxybutyl (meth)acrylates and 4-hydroxybutyl (meth)acrylates, and the like (b) Mono (meth)acrylates of a polyalkylene glycol (the number of alkylene glycol units is for example 2 to 23) such as polyethylene glycol, polypropylene glycol, and the like.

(c) Hydroxy group-containing unsaturated amides such as N-hydroxymethyl (meth)acrylamide, N-(2-hydroxyethyl) (meth)acrylamide and N,N-bis(2-hydroxyethyl) (meth)acrylamide, and the lie (d) Hydroxy group-containing vinyl aromatic compounds such as o-hydroxystyrene, m-hydroxystyrene, p-hydroxystyrene, o-hydroxy-α-methylstyrene, m-hydroxy-α-methylstyrene, p-hydroxy-α-methylstyrene an p-vinylbenzyl alcohol, and the like, (e) (Meth)allyl alcohol compounds and the like.

Among those listed above, hydroxyalkyl (meth)acrylates and hydroxyl group-containing vinyl aromatic compounds are preferred. Any of the hydroxyl group-containing monomers may be employed alone or in combination with each other.

An epoxy group-containig monomer may for example be (meth)allylglycidylether, glycidyl (meth)acrylate and 3,4-oxycyclohexyl (meth)acrylate, and the like. Any of these epoxy group-containing monomers may be employed alone or in combination of two or more.

A monomer having a carboxylic group may for example be unsaturated carboxylic acids such as (meth)acrylic acid, maleic acid, fumaric acid, itaconic acid, tetraconic acid and cinnamic acid, free carboxyli group-containing esters such as a monoester of a non-polymerizable multivalent carboxylic acid such as phthalic acid, succinic acid and adipic acid, and the like with a hydroxy group-containing unsaturated compound such as (meth)allyl alcohol compound and 2-hydroxyethyl (meth)acrylate, and the like as well as their salts.

Among those listed above, unsaturated carboxylic acids are preferred. Any of these carboxylic group-containing monomers may be employed alone or in combination of two or more, and a combination of different types may also be used.

Monomer ⑤ can be selected and used as desired. Two or more of the monomers can be used in combination as described above. For example, a combination of an amino group-containing monomer and a hydroxyl group-containing monomer can be employed as Monomer ⑤. In a repeating unit of a crosslinked rubber particle component, the unit of Monomer ⑤ is present preferably in an amount of 0.1 to 30% by weight, particularly 0.3 to 15% by weight. An amount of Monomer ⑤ less than 0.1% by weight leads to an insufficient affinity of the crosslinked rubber particle with a silica, resulting in a reduced processability of the rubber composition. On the other hand, an amount exceeding 30% by weight leads to a strong coagulation between the crosslinked rubber particle and a silica, resulting in a reduced processability.

In forming a repeating unit (2) in this crosslinked rubber particle component, at least one of a monomer which forms an aromatic vinyl unit (hereinafter referred to as "Monomer ⑥" and a monomer which forms an acrylate unit can also be used if necessary. Also in forming a repeating unit [3], a monomer which forms an aromatic vinyl unit can also be employed if desired. On the contrary, Monomer ⑥ is not used additionally in forming a repeating unit (1).

Monomer ⑥ may for example be styrene, 2-methylstyrene, 3-methylstyrene, 4-methylstyrene, α-methylstyrene, 2,4-dimethylstyrene, 2,4-diisopropylstyrene, 4-tert-butylstyrene and 4-tert-butoxystyrene. As a monomer for forming an acrylate unit, any of those listed as Monomer ③ can be employed. Any of these monomers which are used additionally if desired may be employed alone or in combination of two or more, and a combination of different types may also be used.

In forming a crosslinked rubber particle component, another compound having one copolymerizable unsaturated group may additionally be employed. Such compound may for example be vinylidene cyanide, vinyl chloride, vinylidene chloride, (meth)acrylamide and maleimide, and the like. Any of such monomers may be employed alone or in combination of two or more. The amount of this monomer, when employed, based on 100 parts by weight (hereinafter abbreviated as "parts") as the total of other monomers is 0.1 to 50 parts, especially 0.5 to 30 parts.

While a crosslinked rubber particle can be produced using a radical initiator by an emulsion or suspension polymerization, it is produced preferably by an emulsion polymerization in view of the uniformity in the particle size.

A radical initiator can be an organic peroxide such as benzoyl peroxide, lauroyl peroxide, tert-butyl hydroperoxide, cumene hydroperoxide, p-menthane hydroperoxide, di-tert-butyl peroxide and dicumyl peroxide, and the like. In addition, an azo compound such as azobisisobutyronitrile, an inorganic peroxide such as potassium persulfate, and a redox catalyst and the like such as a combination of any of these peroxides with ferrous sulfate may also be employed. Any of these radical initiators may be employed alone or in combination with each other, and a combination of different types may also be used.

A chain transfer agent such as mercaptans including tert-dodecylmercaptane and n-dodecylmercaptane, and the like, carbon tetrachloride, thioglycols, diterpene, terpinolene and γ-terpinene, and the like may also be used in combination.

An emulsifier employed in an emulsion polymerization may for example be an anionic surfactant, a nonionic surfactant, a cationic surfactant as well as an amphoteric surfactant and the like. A fluorine-based surfactant may also be employed. Any of these emulsifier may be employed alone or in combination of two or more, and a combination of different types may also be used.

A suspension stabilizer employed in a suspension polymerization may for example be polyvinyl alcohol, sodium polyacrylate and hydroxyethyl cellulose, and the like. Any of these suspension stabilizers may be employed alone or in combination of two or more.

In an emulsion or suspension polymerization, each monomer and a radical initiator, and the like may be added all at once prior to the initiation of the polymerization, or they may be added continuously or intermittently over the period of the reaction. The polymerization may be effected in an oxygen-free reactor at 0 to 80° C. with changing temperature or stirring condition or the like as desired during the reaction. The polymerization may be of a continuous system or a batch system.

A "non-crosslinked rubber component" described above is at least one selected from the polymers (a) to (e) shown below.

(a) a polymer comprising as a repeating unit only a conjugated diene unit(formed from Monomer ①);

(b) a polymer comprising as repeating units a conjugated diene unit and an aromatic vinyl unit (formed from Monomer ⑥);

(c) a polymer comprising as repeating units a conjugated diene unit and an α,β-unsaturated nitrile unit (formed from Monomer ②),which may contain an acrylate unit (formed from Monomer ③) and an aromatic vinyl unit if desired;

(d) an acrylic rubber usually containing 50% by weight or more of acrylates, which may contain, for the purpose of introducing an unsaturated group, a monomer unit having two or more polymerizable carbon-carbon double bonds in its molecule (formed from Monomer ⑦); and, (e) a polymer comprising as repeating units an ethylene unit (formed only from ethylene) and an α-olefin unit having 3 to 12 carbon atoms (formed from Monomer ⑧), which may contain a non-conjugated polyene unit (formed from Monomer ⑨) if desired.

A monomer which forms a conjugated diene unit as a constituent of non-crosslinked rubber components (a) to (d) (Monomer ①), a monomer which forms an aromatic vinyl unit as a constituent of non-crosslinked rubber component (b) (Monomer ⑥), a monomer which forms an α,β-unsaturated nitrile unit as a constituent of non-crosslinked rubber component (c) (Monomer ②), and a monomer which forms an acrylate unit as a constituent of non-crosslinked rubber components (c) and (d) (Monomer ③) may respectively be similar to Monomers ① to ③ and ⑥ employed for forming a crosslinked rubber particle component.

In an acryl rubber as non-crosslinked rubber component (d), Monomer ⑦ having two or more polymerizable carbon-carbon double bonds used for introducing an unsaturated group in its molecule preferably has 5 to 25 carbon atoms. Monomer ⑦ may for example be vinyl methacrylate, vinyl acrylate, allyl methacrylate, dicyclopentenyloxyethyl acrylate, 1,1-dimethylpropenyl methacrylate, 1,1-dimethylpropenyl acrylate, 1,1-dimethyl-3-butenyl methacrylate, 1,1-dimethyl-3-butenyl acrylate, divinyl itaconate, divinyl maleate, vinyl 1,1-dimethylpropenylether, vinyl 1,1-dimethyl-3-butenylether and 1-acroyloxy-1-phenylethene. Among those listed above, vinyl methacrylate, allyl methacrylate and dicyclopentenyloxyethyl acrylate are preferred particularly. Any of these Monomers ⑦ may be employed alone or in combination of two or more.

A monomer which forms an ethylene unit in non-crosslinked rubber component (e) is ethylene. Monomer ⑧ may for example be propylene, 1-butene, 1-pentene, 1-hexene, 4-methyl-1-pentene, 1-heptene, 5-methyl-1-hexene, 1-octene, 1-nonene, 5-ethyl-1-hexene, 1-decene and 3-methyl-1-butene. Among those listed above, 1-hexene and 1-octene are preferred particularly. Any of these Monomers ⑧ may be employed alone or in combination of two or more.

While any of ordinarily employed non-conjugated dienes may be employed as Monomer ⑨ without any limitation, it is classified conveniently into two classes based on the formation of a branched chain in a resultant polymer.

A non-conjugated diene giving a polymer having a branched chain may for example be dicyclopentadiene, 2,5-norbornadiene, 5-vinyl-2-norbornene as well as an aliphatic α,ω-diene having 6 to 20 carbon atoms and the like. Such aliphatic α,ω-diene may for example be 1,5-hexadiene, 1,6-heptadiene, 1,7-octadiene, 1,8-nonadiene and 1,9-decadiene, and the like.

A non-conjugated diene giving a polymer having no branched chain may for example be 5-ethylidene-2-norbornene, 5-methylene-2-norbornene, 5-isopropenyl-2-norbornene, 5-(1-butenyl)-2-norbornene, cyclooctadiene, vinylcyclohexene, 1,5,9-cyclododecatriene, 6-methyl-4,7,8,9-tetrahydroindene, 2,2'-dicyclopentenyl-trans-1,2-diviylcyclobutane, 2-methyl-1,4-hexadiene, 1,6-octadiene, 1,4-hexadiene, 7-methyl-1,6-octadiene, 5,7-dimehyl-1,6-octadiene, 3,7-dimethyl-1,6-octadiene, 1,4,7-octatriene, dicyclooctadiene, methylenenorbornene, and the like.

Among these non-conjugated polyenes, preferred ones giving polymers having branched chains are 1,9-decadiene and dicyclopentadiene. Preferred ones giving polymers having no branched chains are 5-ethylidene-2-norbornene, 1,4-hexadiene, 7-methyl-1,6-octadiene and 5,7-dimethyl-1,6-octadiene. While any of these non-conjugated polyenes may be employed alone or in combination of two or more, it is preferable to use at least one giving a polymer having a branched chain and at least one giving a polymer having no branched chain.

A non-crosslinked rubber component selected from (a) to (e) may be one of those shown below.

(a) Polymer comprising as repeating unit only conjugated diene unit;

①An emulsion-polymerized polybutadiene rubber, ② a high-cis-polybutadiene rubber prepared using a Ziegler catalyst whose main components are a compound of a transition metal such as Ti, Ni and Co and an organic aluminium compound or a catalyst consisting of an Nd compound and an organic aluminium compound, ③ a high-trans-polybutadiene rubber prepared using a catalyst consisting of a Ba compound and an organic magnesium compound or an organic aluminium compound and ④ an emulsion-polymerized polyisoprene rubber, a high-cis-polyisoprene rubber, a butadiene-isoprene copolymeric rubber, a natural rubber and a chloroprene rubber, and the like (b) Polymer comprising as repeating units conjugated diene unit and aromatic vinyl unit;

A styrene-butadiene random copolymeric rubber, a styrene-butadiene block copolymeric rubber, a styrene-isoprene random copolymeric rubber, a styrene-isoprene-butadiene random copolymeric rubber, a styrene-butadiene-styrene triblock copolymeric rubber and a styrene-isoprene-styrene triblock copolymeric rubber, and the like (c) Polymer comprising as essential repeating units conjugated diene unit and α,β-unsaturated nitrile unit, optionally with aromatic vinyl unit and acrylate unit;

An acrylonitrile-butadiene copolymeric rubber, an acrylonitrile-isoprene copolymeric rubber, an acrylonitrile-styrene-butadiene copolymeric rubber and an acrylonitrile-styrene-isoprene copolymeric rubber, and the like (d) Acrylic rubber; and, (e) Polymer comprising as essential repeating units ethylene unit and α-olefin unit having 3 to 12 carbon atoms, optionally with a non-conjucated polyene unit;

An ethylene/propylene copolymeric rubber, an ethylene/1-butene copolymeric rubber, an ethylene/1-pentene copolymeric rubber, an ethylene/1-hexene copolymeric rubber and an ethylene/1-octene copolymeric rubber and the like, and an ethylene/propylene/diene copolymeric rubber and the like having a monomer unit which forms a non-conjugated polyene unit such as ethylene/propylene/5-ethylidene-2-norbornene, and the like.

A non-crosslinked rubber component can be one into which at least one functional group selected from an amino group, a hydroxyl group, an epoxy group, a carboxyl group and an alkoxysilyl group is introduced. A monomer for introducing an amino group, a hydroxyl group, an epoxy group and a carboxyl group may be Monomer ⑤ similarly to a crosslinked rubber particle component.

An alkoxysilyl group-containing monomer may for example be:

(meth)acryloxymethyl trimethoxysilane, (meth) acryloxymethyl methyldimethoxysilane, (meth) acryloxymethyl dimethylmethoxysilane, (meth) acryloxymethyl triethoxysilane, (meth)acryloxymethyl methyldiethoxysilane, (meth)acryloxymethyl dimethylethoxysilane, (meth)acryloxymethyl tripropoxysilane, (meth)acryloxymethyl methyldipropoxysilane, (meth)acryloxymethyl dimethylpropoxysilane, γ-(meth)acryloxypropyl trimethoxysilane, γ-(meth)acryloxypropyl methyldimethoxysilane, γ-(meth)acryloxypropyl dimethylmehtoxysilane, γ-(meth)acryloxypropyl triethoxysilane, γ-(meth)acryloxypropyl methyldiethoxysilane, γ-(meth)acryloxypropyl dimethylethoxysilane, γ-(meth)acryloxypropyl tripropoxysilane, γ-(meth)acryloxypropyl methyldipropoxysilane, γ-(meth)acryloxypropyl dimethylpropoxysilane, γ-(meth)acryloxypropyl methyldiphenoxysilane, γ-(meth)acryloxypropyl dimethyliphenoxysilane, γ-(meth)acryloxypropyl methyldibenzyloxysilane and γ-(meth)acryloxypropyl dimethylphenoxysilane. Any of these alkoxysilyl group-containing monomers may be employed alone or in combination of two or more.

Any of the monomer types may be employed alone or in combination of two or more, and a combination of different types may also be used. A concomitant use of an alkoxysilyl group can serve to increase the affinity of a silica and a non-crosslinked rubber component.

A non-crosslinked rubber component can be produced by subjecting respective constituent monomers to a polymerization method selected appropriately based on the particular types of the monomers employed, such as an emulsion polymerization, a suspension polymerization, a solution radical polymerization, a solution anion polymerization or a transition metal-catalyzed solution polymerization or the like. A non-crosslinked rubber composition into which a functional group is introduced can be produced using as a further component Monomer ⑤ employed for forming a crosslinked rubber particle component or an alkoxysilyl group described above. While the polymerization method employed here is not particularly limited, an emulsion polymerization and a suspension polymerization are preferred.

The toluene-insolubles based on the solid remained in the filtrate obtained by a filtration through a 100 mesh-sized wire mesh after immersing a non-crosslinked rubber composition in 100 ml of toluene at room temperature for 24 hours is "20% by weight or less", preferably 15% by weight or less, more preferably 10% by weight or less. The weight-average molecular weight represented as polystyrene determined by a GPC (gel permeation chromatography) is 50000 to 2000000.

A rubber composition of the invention preferably contains, based on 100 parts by weight as the total of the rubber components contained in this rubber composition, 1 to 70 parts of a crosslinked rubber particle component and 30 to 99 parts of a non-crosslinked rubber component. An amount of the crosslinked rubber particle component less than 1 part results in a low processability-improving effect, while one exceeding 70 parts gives a vulcanized rubber having problematically deteriorated physical characteristics.

A rubber composition of the invention can be supplemented with a mineral oil-based softener. It is generally called an oil extended-type rubber. The mineral oil-based softener may be used an aromatic process oil, a naphthene-based process oil, aparaffin-based process oil, and the like. Any of such softeners may be employed alone or in combination of two or more. The amount of the softener is usually 10 to 80 parts, preferably 10 to 60 parts, more preferably 10 to 50 parts based on 100 parts as the total amount of a crosslinked rubber particle component and a non-crosslinked rubber composition. The mineral oil-based softener can be added to the crosslinked rubber particle component defined above or the non-crosslinked rubber component defined above.

A rubber composition of the invention, when used practically, may usually be supplemented with a reinforcing agent. Such reinforcing agent maybe a "silica" especially. A silica may be one used generally as a white reinforcing agent. The amount of the silica based on 100 parts as the total amount of a crosslinked rubber particle and a non-crosslinked rubber composition is 2 to 120 parts, preferably 10 to 100 parts, more preferably 30 to 100 parts. An amount of the silica less than 2 parts may leads to a problematically insufficient reinforcing effect. On the other hand, an amount of 120 parts is enough for obtaining a sufficient reinforcing effect, and no further amount is required.

While the type of a silica is not particularly limited, a wet process type white carbon, a dry process type white carbon, a colloidal silica and a precipitated silica, and the like described in JP-A 62-62838 can be employed. Among those listed above, a wet process type white carbon whose main component is silicic hydrate is preferred particularly. Any of these silica-based compound may be employed alone or in combination of two or more. While the specific surface area of the silica is not particularly limited, a nitrogen absorption specific surface area (area determined by BET method in accordance with ASTM D3037-81) is usually 50 to 400 $m^2/g$, preferably 50 to 220 $m^2/g$, more preferably 70 to 220 $m^2/g$, for the purpose of achieving a sufficient improvement in the reinforcing performance, the wearing resistance and the exothermic behavior, and the like.

A combination of a silica and a carbon black can be employed as a reinforcing agent. When a silica and a carbon black are employed in combination, their total amount is preferably 10 to 120 parts, more preferably 40 to 100 parts based on 100 parts as the total of a crosslinked rubber particle component and a non-crosslinked rubber composition. A total amount less than 10 parts may lead to a problematically insufficient reinforcing effect. On the other hand, an amount of 120 parts is enough for obtaining a sufficient reinforcing effect, and no further amount is required. While the weight ratio of a silica and a carbon black is not particularly limited, 100 parts of the silica is combined preferably with 5 to 200 parts, especially 10 to 150 parts of the carbon black. Within the range of the weight ratio specified above, a vulcanized rubber having excellent tensile strength and wearing resistance, and the like can be obtained.

While the type of a carbon black or the like is not particularly limited, those which may be employed are a furnace black, an acetylene black, a thermal black, a channel black, a graphite, and the like. Among those listed above, a furnace black is preferred including SAF, ISAF, ISAF-HS, ISAF-LS, IISAF-HS, HAF, HAF-HS, HAF-LS, FEF, and the like. Any of these carbon blacks may be employed alone or in combination of two or more.

While the nitrogen absorption specific surface area of a carbon black determined similarly to a silica is not particularly limited, it is usually 5 to 200 $m^2/g$, preferably 50 to 150 $m^2/g$, more preferably 80 to 130 $m^2/g$, for the purpose of achieving a sufficient improvement in the tensile strength and the wearing resistance of a vulcanized rubber and the like. While the DBP absorption level of the carbon black is not particularly limited as well, it is 5 to 300 ml/100 g, preferably 50 to 200 ml/100 g, more preferably 80 to 160 ml/100 g, for the purpose of a sufficient improvement in the tensile strength and the wearing resistance and the like. A further improvement in the wearing resistance can be achieved by using as a carbon black a high structure carbon black described in JP-A 5-230290, whose cetyltrimethylammonium bromide absorption specific surface area is 110 to 170 $m^2/g$ and whose DBP (24M4DBP) oil absorption level after compressing under 165 MPa four times repetitively is 110 to 130 ml/100 g.

A carbon-silica dual-phase filler as a reinforcing agent may also be added.

A rubber composition of the invention can be supplemented with various components shown below in addition to a reinforcing agent described above.

A clay, calcium carbonate and/or magnesium carbonate, and the like as a filler, each in an appropriate amount, may also be added. A petroleum-based formulated oil such as an aromatic process oil, a naphthene-based process oil and a paraffin-based process oil, and the like may also be added as a rubber extending oil. Such extending oil is preferably an aromatic or naphthene-based process oil.

When a silica is employed as a reinforcing agent, a concomitant use of a silane coupling agent serves to further improve the balance between the processability and the reinforcing performance as in the invention. The amount of the silane coupling agent to be incorporated is less than 20 parts, preferably less than 12 parts based on 100 parts of the silica. One which can also be employed as an activator is diethylene glycol, polyethylene glycol, a silicone oil, triethanolamine, tri-iso-propanolamine and the like. An anti-aging agent and a processing aid may additionally be employed in appropriate amounts.

A crosslinking agent may for example be a sulfur such as a powdered sulfur, a precipitated sulfur, a colloidal sulfur, an insoluble sulfur and a highly dispersible sulfur, and the like, a halogenated sulfur such as sulfur monochloride, sulfur dichloride, and the like, an organic peroxide such as dicumyl peroxide and di-t-butyl peroxide, and the like, a quinone dioxime such as p-quinone dioxime and p,p'-dibenzoylquinone dioxime, an organic multivalent amine compound such as triethylene tetramine, hexamethylenediamine carbamate and 4,4'-methylenebis-o-chloroaniline as well as an alkylphenol resin having a methylol group and the like. Among those listed above, a sulfur is preferred and a powdered sulfur is particularly preferred. Any of these crosslinking agents may be employed alone or in combination of two or more, and a combination of different types may also be used.

A crosslinking agent may be present in an amount usually of 0.1 to 15 parts, preferably 0.3 to 10 parts, particularly 0.5 to 5 parts based on 100 parts as the total of a crosslinked rubber particle component and a non-crosslinked rubber component. The incorporation of the crosslinking agent in an amount ratio within the range specified above results in sufficiently improved tensile strength and wearing resistance, and the like.

A vulcanization promoter may for example be a sulfenamide-based vulcanization promoter such as N-cyclohexyl-2-benzothiazolesulfenamide, N-t-butyl-2-benzothiazolesulfenamide, N-oxyetyhlene-2-benzothiazolesulfenamide and N,N'-diisopropyl-2-benzothiazolesulfenamide, a guanidine-based vulcanization promoter such as diphenylguanidine, diorthotolylguanidine and orthotolylbiguanidine and a thiourea-based vulcanization promoter such as thiocarboanilide, diorthotolylthiourea, ethylene thiourea, diethylthiourea and trimethylthiourea;

a thiazol-based vulcanization promoter such as 2-mercaptobenzothiazol, dibenzothiazoledizulfide 2-mercaptobezothiazole zinc salt, 2-mercaptobenzothiazole sodium salt, 2-mercaptobenzothiazole cyclohexylamine salt and 2-(2,4-dinitrophenylthio)benzothiazole and thiuram-based vulcanization promoter such as tetramethylthiuram monosulfide, tetramethylthiuram disulfide, tetraethylthiuram disulfide, tetrabutylthiuram disulfide and dipentamethylenethiuram tetrasulfide;

a dithiocarbamate-based vulcanization promoter such as sodium dimethyldithiocarbamate, sodium diethyldithiocarbamate, sodium di-n-butyldithiocarbamate, lead dimethyldithiocarbamate, zinc dimethyldithiocarbamate, zinc diethyldithiocarbamate, zinc di-n-butyldithiocarbamate, zinc pentamethylenedithiocarbamate, zinc ethylphenyldithiocarbamate, tellurium diethyldithiocarbamate, selenium dimethyldithiocarbamate, selenium diethyldithiocarbamate, copper dimethyldithiocarbamate, iron dimethyldithiocarbamate, diethylamine diethyldithiocarbamate, piperidine pentamethylene dithiocarbamate and pipecolin methylpentamethylene dithiocarbamate and xanthate-based vulcanization promoter such as sodium isopropylxanthate, zinc isopropylxanthate and zinc butylxanthate, and the like.

Any of these vulcanization promoters may be employed alone or in combination of two or more, and a combination of different types may also be used. It is particularly preferred to use as a vulcanization promoter at least a sulfenamide-based vulcanization promoter. The amount of a vulcanization promoter to be added is 0.1 to 15 parts, preferably 0.3 to 10 parts, more preferably 1 to 10 parts based on 100 parts as the total of a crosslinked rubber particle component and a non-crosslinked rubber component.

As a vulcanization activator, a higher fatty acid such as stearic acid and a zinc oxide, and the like can be employed. A preferred zinc oxide is one having a high surface activity and a particle size of 5 µm or less. Such zinc oxide may for example be an activated zinc oxide powder whose particle size is 0.05 to 0.2 µm or a zinc oxide powder whose particle size of 0.3 to 1 µm and the like. Those which may also be employed are an amine-based dispersant and a zinc oxide whose surface is treated with a humectant and the like.

Any of these vulcanization may be employed alone or in combination of two or more, and a combination of different types may also be used. A vulcanization activator may be added in an appropriate amount in view of its type, and when a higher fatty acid is used it is added in an amount of 0.05 to 15 parts, preferably 0.1 to 10 parts, more preferably 0.5 to 5 parts based on 100 parts as the total of crosslinked rubber particle and non-crosslinked rubber components. When a zinc oxide is used, it is added in an amount of 0.05 to 10 parts, preferably 0.1 to 7 parts, more preferably 0.5 to 5 parts. An amount within the range specified above is particularly preferred since it results in an extremely well-balanced improvement in the processability of a rubber composition and the tensile strength and the wearing resistance, and the like of a vulcanized rubber.

A rubber composition of the invention and a rubber product made therefrom can be produced as described below.

First, a crosslinked rubber particle, a non-crosslinked rubber component, a reinforcing agent such as a silica, a carbon black and a carbon-silica dual-phase filler, and the like, a rubber extending oil and other auxiliary components, and the like are kneaded using a kneader such as Banbury mixer or the like at a temperature of 70 to 180° C. Subsequently, the kneaded mixture is cooled and combined with a vulcanizing agent and a vulcanization promoter, and the like such as a sulfur using Banbury mixer or a mixing roll or the like to mold into a desired shape. A vulcanization at a temperature of 140 to 180° C. is then effected to obtain a desired vulcanized rubber, i.e., a rubber product.

Such vulcanized rubber can be used as a rubber product in various industrial fields due to its excellent characteristics. For example, it can be used as a material for an industrial product such as a rubber roll, a grinding roll, a belt, a hose, a sponge, a rubber board and a rubber-coated fabric, and the like, a shoe part for example of a transparent shoe, an ordinary colored shoe and a sponge-soled shoe, and the like, a tire of a large-sized or small-sized car such as a tread, a base tread, a side wall and a rubber chaser, and the like, and a sanitary material such as a contraceptive rubber and a health care product, and the like.

DESCRIPTION OF THE PREFERRED EMBODIMENTS

The present invention is further described in the following examples.

(1) Production of Crosslinked Rubber Particle Component

A polymerization reactor was charged with 200 parts of water, 4.5 parts of rosin acid soap and a monomer having each composition shown in Table 1 (in which the unit is "part"). Subsequently, the temperature of the polymerization reactor was set at 5° C., and 0.1 parts of p-menthane hydroperoxide as a radical initiator, 0.07 parts of sodium ethylenediamine tetracetate, 0.05 parts of ferrous sulfate heptahydrate and 0.15 parts of sodium formaldehyde sulfoxylate were added and the polymerization was continued for 12 hours to obtain an emulsion containing a crosslinked rubber particle. The polymerization conversion rate was about 100%.

Subsequently, this emulsion was added with 37.5 parts of an aroma oil based on 100 parts of the crosslinked rubber particle if necessary, was coagulated using sulfuric acid and a salt to form crumb, which was then dried using a hot blast drier to obtain each of the crosslinked rubber particles 1 to 8 having the monomer compositions shown in Table 1.

The crosslinked rubber particle component No.5 in Table 1 is of an oil extended rubber type to which an aroma oil is added (see Table 6), while others are of a non-oil extended rubber type to which no aroma oil is added.

TABLE 1

| Crosslinked rubber particle component | 1 | 2 | 3 | 4 | 5 | 6 | 7 | 8 |
|---|---|---|---|---|---|---|---|---|
| Raw material | | | | | | | | |
| Butadiene | 98 | 74 | 74 | 64 | 69 | 69 | 69 | 69 |
| Acrylonitrile | | 25 | | 25 | 25 | 25 | 25 | 25 |
| Butyl acrylate | | | 25 | | | | | |
| Styrene | | | | 10 | | | | |
| Divinylbenzene | 2 | 1 | 1 | 1 | 1 | 1 | 1 | 1 |
| N,N-Diethylaminoethyl methacrylate | | | | | | 5 | | |
| 2-Hydroxyethyl methacrylate | | | | | 5 | | | |
| Glycidyl methacrylate | | | | | | | | 5 |
| Methacrylic acid | | | | | | | 5 | |
| Toluene-insolubes (wt %) | 99 | 98 | 97 | 98 | 97 | 97 | 98 | 97 |
| Number-average particle size (nm) | 60 | 65 | 60 | 60 | 65 | 60 | 60 | 60 |

(2) Production of Non-crosslinked Rubber Component

A polymerization reactor was charged with 200 parts of water, 4.5 parts of rosin acid soap and a monomer having each composition shown in Table 2 (in which the unit is "part"). Subsequently, the temperature of the polymerization reactor was set at 5° C., and 0.1 parts of p-menthane hydroperoxide as a radical initiator, 0.07 parts of sodium ethylenediamine tetracetate, 0.05 parts of ferrous sulfate heptahydrate and 0.15 parts of sodium formaldehyde sulfoxylate were added and the polymerization was initiated. When the polymerization conversion rate reached 60%, diethylhydroxylamine was added to terminate the polymerization, and an unreacted monomer was recovered by a steam stripping to obtain an emulsion containing a non-crosslinked rubber component.

Subsequently, this emulsion was combined with 37.5 parts of an aroma oil based on 100 parts of the non-crosslinked rubber component if necessary, was coagulated using sulfuric acid and a salt to form crumb, which was then dried using a hot blast drier to obtain each of the non-crosslinked rubber components 1 to 8 having the monomer compositions shown in Table 2.

The non-crosslinked rubber particle components No. 7 and 8 in Table 2 are of an oil extended-type rubber to which an aroma oil is added (see Table 6), while others are of a non-oil extended rubber type to which no aroma oil is added.

Each of the following three non-crosslinked rubbers was also employed as a non-crosslinked rubber component.
(a) Solution polymerization styrene-butadiene copolymeric rubber, JSR Co., Ltd., Trade name: "JSR SL574", Styrene content; 15% by weight, 1,2-Vinyl content; 57%, 1,4-Trans content; 27%, 1,4-Cis content; 16%
(b) Polybutadiene rubber, JSR Co., Ltd., Trade name: "JSR BR 01"
(c) Ethylene-propylene-5-ethylidene-2-norbornene copolymeric rubber, JSR Co., Ltd., Trade name: "JSR EP33", Ethylene content; 52% by weight, 5-ethylidene-2-norbornene content; 8.1% by weight

TABLE 2

| Non-crosslinked rubber component | 1 | 2 | 3 | 4 | 5 | 6 | 7 | 8 |
|---|---|---|---|---|---|---|---|---|
| Raw material | | | | | | | | |
| Butadiene | 66.5 | 65.5 | 64.5 | 65.5 | 65.5 | 65.5 | 60 | 60 |
| Styrene | | | | | | | 32 | 32 |
| Acrylonitrile | 33.5 | 33.5 | 33.5 | 33.5 | 33.5 | 33.5 | 8 | |
| Butyl acrylate | | | | | | | | 8 |
| N,N-Diethylamino-ethyl methacrylate | | 2 | | | | | | |
| Hydroxyethyl methacrylate | | | 1 | | | | | |
| Glycidyl methacrylate | | | | | 1 | | | |
| Methacrylic acid | | | | 1 | | | | |
| γ-Methacryloxy-propyl trisopropoxysilane | | | | | | 1 | | |
| Content | | | | | | | | |
| Butadiene | 65 | 64.5 | 63.1 | 64.2 | 64.2 | 64.2 | 65 | 65 |
| Styrene | | | | | | | 25 | 25 |
| Acrylonitrile | 35 | 35 | 35 | 35 | 35 | 35 | 10 | |
| Butyl acrylate | | | | | | | | 10 |
| N,N-Diethylamino-ethyl methacrylate | | 1.9 | | | | | | |
| Hydroxyethyl methacrylate | | | 0.5 | | | | | |
| Glycidyl methacrylate | | | | | 0.8 | | | |
| Methacrylic acid | | | | 0.8 | | | | |
| γ-Methacryloxy-propyl trisopropoxysilane | | | | | | 0.8 | | |
| Toluene-insolubes (wt %) | 3 | 2 | 2 | 3 | 4 | 3 | 3 | 4 |

The content of each monomer in Table 2 was determined by the methods described below.
(a) Styrene content (% by weight); A calibration curve made by an infrared absorption spectroscopy was employed.
(b) Acrylonitrile content (% by weight); A rubber was dissolved in toluene and re-precipitated from methanol, and this procedure was repeated twice to purify the rubber, which was then dried in vacuum, subjected to an elemental analysis to obtain a nitrogen content, from which the content was calculated.
(c) Acrylate content (% by weight); Determined from $^{13}$C-MR spectrum.
(d) Amino group-containing monomer content (% by weight); A rubber was dissolved in toluene and re-precipitated from methanol, and this procedure was repeated twice to purify the rubber, which was then dried in vacuum, subjected to an elemental analysis to obtain a nitrogen content, from which the content was calculated.
(e) Hydroxyl group-containing monomer content (% by weight); A rubber was dissolved in toluene and re-precipitated from methanol, and this procedure was repeated twice to purify the rubber, which was then dried in vacuum and analyzed by $^1$H-NMR with 270 MHz.
(f) Epoxy group-containing monomer content (% by weight); A rubber was dissolved in toluene and re-precipitated from methanol, and this procedure was repeated twice to purify the rubber, which was then titrated in accordance with Jay method [R. R. Jay; Anal. Chem., 36, 667 (1964)].
(g) Carboxyl group-containing monomer content (% by weight); A rubber was dissolved in toluene and re-precipitated from methanol, and this procedure was repeated twice to purify the rubber, which was then dried in vacuum, dissolved in chloroform, and then titrated until being neutralized.
(h) Alkoxysilyl group-containing monomer content (% by weight); A rubber was dissolved in toluene and re-precipitated from methanol, and this procedure was repeated twice to purify the rubber, which was then dried in vacuum and analyzed by $^1$H-NMR with 270 MHz.

The results of the determinations described above are included in Table 2.

(4) Preparation of Rubber Composition and Vulcanized Rubber

A crosslinked rubber particle shown in Table 1 and a non-crosslinked rubber component in Table 2 were employed in a formulation shown in Tables 3 to 7 and kneaded using a LABOPLASTMILL (TOYOSEKI Co., Ltd.) to obtain each of the rubber compositions of Examples 1 to 20 in Tables 3 to 7. Subsequently, each composition was vulcanized using a vulcanization press at 160° C. for 20 minutes to obtain a vulcanized rubber. Also a wet mixing rubber shown in Table 5 was used to obtain each of the rubber compositions of Examples 13 to 15 shown in Table 6, which were vulcanized similarly. Furthermore, a non-crosslinke rubber component was used alone without any crosslinked rubber particle to obtain each of the rubber compositions of Comparatives 1 to 7 shown in Table 5 to 7 which was then vulcanized similarly.

TABLE 3

| | Example | | | | | |
|---|---|---|---|---|---|---|
| | 1 | 2 | 3 | 4 | 5 | 6 |
| Rubber component | | | | | | |
| Crosslinked rubber particle component | | | | | | |
| 1 | 10 | | | | | |
| 2 | | 10 | | | | |
| 3 | | | 10 | | | |
| 4 | | | | 10 | | |
| 5 | | | | | 10 | 10 |
| Non-crosslinked rubber component | | | | | | |
| 1 | 90 | 90 | 90 | 90 | 90 | 90 |
| Silica | 60 | 60 | 60 | 60 | 60 | 60 |
| Carbon black | 10 | 10 | 10 | 10 | 10 | 10 |
| Silane coupling agent | 3 | 3 | 3 | 3 | 6 | 3 |
| Zinc oxide | 3 | 3 | 3 | 3 | 3 | 3 |
| Stearic acid | 2 | 2 | 2 | 2 | 2 | 2 |
| Anti-aging agent | 1 | 1 | 1 | 1 | 1 | 1 |
| Sulfur | 2.2 | 2.2 | 2.2 | 2.2 | 1.5 | 2.2 |
| Vulcanization promoter | | | | | | |
| (a) | 1.5 | 1.5 | 1.5 | 1.5 | 1.5 | 1.5 |
| (b) | 1 | 1 | 1 | 1 | 1 | 1 |
| Processability | ⊙ | ⊙ | ⊙ | ⊙ | ⊙ | ⊙ |
| Shrinkage of unvulcanized rubber sheet | ⊙ | ⊙ | ⊙ | ⊙ | ⊙ | ⊙ |
| Elongation (%) | 540 | 550 | 560 | 550 | 570 | 560 |
| Tensile strength (MPa) | 17 | 16 | 16 | 17 | 16 | 14 |
| Wearing resistance | 5 | 4 | 4 | 5 | 5 | 4 |

TABLE 4

| | Example | | | | | |
|---|---|---|---|---|---|---|
| | 7 | 8 | 9 | 10 | 11 | 12 |
| Rubber component | | | | | | |
| Crosslinked rubber particle component | | | | | | |
| 5 | 10 | 10 | 10 | 10 | 10 | |
| 6 | | | | | | 10 |
| Non-crosslinked rubber component | | | | | | |
| 1 | | | | | | 90 |
| 2 | 90 | | | | | |
| 3 | | 90 | | | | |
| 4 | | | 90 | | | |
| 5 | | | | 90 | | |
| 6 | | | | | 90 | |
| Silica | 60 | 60 | 60 | 60 | 60 | 60 |
| Carbon black | 10 | 10 | 10 | 10 | 10 | 10 |
| Silane coupling agent | 3 | 3 | 3 | 3 | 3 | 3 |
| Zinc oxide | 3 | 3 | 3 | 3 | 3 | 3 |
| Stearic acid | 2 | 2 | 2 | 2 | 2 | 2 |
| Anti-aging agent | 1 | 1 | 1 | 1 | 1 | 1 |
| Sulfur | 2.2 | 2.2 | 2.2 | 2.2 | 2.2 | 2.2 |
| Vulcanization promoter | | | | | | |
| (a) | 1.5 | 1.5 | 1.5 | 1.5 | 1.5 | 1.5 |
| (b) | 1 | 1 | 1 | 1 | 1 | 1 |
| Processability | ⊙ | ⊙ | ⊙ | ⊙ | ⊙ | ⊙ |
| Shrinkage of unvulcanized rubber sheet | ⊙ | ⊙ | ⊙ | ⊙ | ⊙ | ⊙ |
| Elongation (%) | 490 | 520 | 520 | 480 | 490 | 520 |
| Tensile strength (MPa) | 21 | 19 | 19 | 21 | 21 | 18 |
| Wearing resistance | 5 | 5 | 5 | 5 | 5 | 5 |

TABLE 5

| | Example | | | Comparative example | |
|---|---|---|---|---|---|
| | 13 | 14 | 15 | 1 | 2 |
| Rubber component | | | | | |
| Crosslinked rubber particle component | | | | | |
| 5 | | | 5 | | |
| 7 | 10 | | | | |
| 8 | | 10 | | | |
| Non-crosslinked rubber component | | | | | |
| 1 | 90 | 90 | 95 | 100 | 100 |
| Silica | 60 | 60 | 60 | 60 | 60 |
| Carbon black | 10 | 10 | 10 | 10 | 10 |
| Silane coupling agent | 3 | 3 | 3 | 6 | 3 |
| Zinc oxide | 3 | 3 | 3 | 3 | 3 |
| Stearic acid | 2 | 2 | 2 | 2 | 2 |
| Anti-aging agent | 1 | 1 | 1 | 1 | 1 |
| Sulfur | 2.2 | 2.2 | 2.2 | 1.5 | 2.2 |
| Vulcanization promoter | | | | | |
| (a) | 1.5 | 1.5 | 1.5 | 1.5 | 1.5 |
| (b) | 1 | 1 | 1 | 1 | 1 |
| Processability | ⊙ | ⊙ | ⊙ | ○ | Δ |
| Shrinkage of unvulcanized rubber sheet | ⊙ | ⊙ | ⊙ | Δ | X |
| Elongation (%) | 530 | 510 | 570 | 590 | 620 |
| Tensile strength (MPa) | 16 | 18 | 15 | 13 | 11 |
| Wearing resistance | 5 | 5 | 4 | 3 | 2 |

TABLE 6

| | Example | | Comparative example | |
|---|---|---|---|---|
| | 16 | 17 | 3 | 4 |
| Rubber component | | | | |
| Crosslinked rubber particle component | | | | |
| 5 | 10 | 10 | | |
| Non-crosslinked rubber component | | | | |
| 7 | 90 | | 100 | |
| 8 | | 90 | | 100 |
| aroma oil | 37.5 | 37.5 | 37.5 | 37.5 |
| Silica | 60 | 60 | 60 | 60 |
| Carbon black | 10 | 10 | 10 | 10 |
| Silane coupling agent | 3 | 3 | 3 | 6 |
| Zinc oxide | 3 | 3 | 3 | 3 |
| Stearic acid | 2 | 2 | 2 | 2 |
| Anti-aging agent | 1 | 1 | 1 | 1 |
| Sulfur | 2.2 | 2.2 | 2.2 | 2.2 |
| Vulcanization promoter | | | | |
| (a) | 1.5 | 1.5 | 1.5 | 1.5 |
| (b) | 1 | 1 | 1 | 1 |
| Processability | ⊙ | ⊙ | Δ | Δ |
| Shrinkage of unvulcanized rubber sheet | ⊙ | ⊙ | X | X |
| Elongation (%) | 550 | 550 | 580 | 570 |
| Tensile strength (MPa) | 20 | 20 | 18 | 18 |
| Wearing resistance | 5 | 5 | 3 | 3 |

TABLE 7

|  | Example | | | Comparative example | | |
| --- | --- | --- | --- | --- | --- | --- |
|  | 18 | 19 | 20 | 5 | 6 | 7 |
| Rubber component |  |  |  |  |  |  |
| Crosslinked rubber particle component |  |  |  |  |  |  |
| 5 | 10 | 10 | 10 |  |  |  |
| Non-crosslinked rubber component |  |  |  |  |  |  |
| (a) | 90 |  |  | 100 |  |  |
| (b) |  | 90 |  |  | 100 |  |
| (c) |  |  | 90 |  |  | 100 |
| Silica | 50 | 50 | 50 | 50 | 50 | 50 |
| Carbon black | 10 |  |  | 10 |  |  |
| Silane coupling agent | 5 | 0.5 | 0.5 | 5 | 0.5 | 0.5 |
| Zinc oxide | 3 | 3 | 3 | 3 | 3 | 3 |
| Stearic acid | 2 | 2 | 2 | 2 | 2 | 2 |
| Anti-aging agent | 1 | 1 | 1 | 1 | 1 | 1 |
| Sulfur | 1.5 | 1.5 | 1.5 | 1.5 | 2.2 | 2.2 |
| Vulcanization promoter |  |  |  |  |  |  |
| (a) | 1.5 | 1.5 | 1.5 | 1.5 | 1.5 | 1.5 |
| (b) | 1 | 1 | 1 | 1 | 1 | 1 |
| Processability | ⊚ | ⊚ | ⊚ | ○ | Δ | Δ |
| Shrinkage of unvulcanized rubber sheet | ⊚ | ⊚ | ⊚ | Δ | X | X |
| Elongation (%) | 570 | 590 | 590 | 470 | 600 | 470 |
| Tensile strength (MPa) | 16 | 21 | 21 | 14 | 19 | 13 |
| Wearing resistance | 5 | 4 | 4 | 3 | 3 | 2 |

The components incorporated in the formulations described above were as follows.

① Silica; NIPPON SILICA INDUSTRIAL Co., Ltd., Trade name: "NIPSIL VN3"
② Carbon black; MITSUBISHI CHEMICAL Co., Ltd., Trade name: "DIABLACK N220"
③ Silane coupling agent; GE Toshiba Silicon Co., Ltd., Trade name: "TSL8380"
④ Anti-aging agent; OUCHISHINKO CHEMICAL INDUSTRIAL CO., LTD., Trade name: "NOCRAC 810NA"
⑤ Vulcanization promoter (a); OUCHISHINKO CHEMICAL INDUSTRIAL CO., LTD., Trade name: "NOCCELER CZ"
⑥ Vulcanization promoter (b); OUCHISHINKO CHEMICAL INDUSTRIAL CO., LTD., Trade name: "NOCCELER D"

Each of the rubber compositions and the vulcanized rubbers was examined for its physical characteristics by the methods shown below.

(A) Processability; A rubber composition was evaluated based on its winding around a roll upon kneaded using the roll. The evaluation criteria are shown below. ⊚: Excellent with no separation from roll surface. ○: Satisfactory with slight separation. Δ: Poor winding with frequent separation. X: Extremely poor with almost no winding.

(B) Shrinkage of unvulcanized rubber sheet; Evaluation was based on the degree of the shrinkage of an unvulcanized rubber sheet after kneading a rubber composition by a roll and also based on the surface condition when observed visually. The evaluation criteria are shown below. ⊚: Excellent with extremely low shrinkage and smooth and glossy surface of unvulcanized rubber sheet. ○: Satisfactory with slight shrinkage and smooth surface of unvulcanized rubber sheet. Δ: Poor with shrinkage. X: Extremely poor with extremely high shrinkage and crack in edge of unvulcanized rubber sheet.

(C) Tensile characteristics: In accordance with JIS K 6301 using a type 3 test piece, the elongation at break (%) and the tensile strength (MPa) were determined at 25° C. and the tensile speed of 500 mm/min.

(D) Wearing resistance; An AKRON wearing tester was employed for the determination in accordance with JIS K 6264. The results were represented as one of the integers from 0 (extensive wearing) to 5 (extremely low wearing).

The results of the evaluation are included in Tables 3 to 7.

As results from Tables 3 to 7, each of the rubber compositions of Examples 1 to 20 exhibited excellent processability and dimension stability, and gave a vulcanized rubber having satisfactorily large elongation and tensile strength together with a satisfactory wearing resistance which scored 4 or 5. On the other hand, each of Comparatives 1 to 7 using no crosslinked rubber particle component exhibited a poorness in both of the processability and the dimension stability, especially in the dimension stability, with a poor wearing resistance which scored only 3 or 2 and a tensile strength which was sometimes poor.

What is claimed is:

1. A rubber composition comprising [1] a crosslinked rubber particle component whose toluene-insolubles is 50% by weight or more and whose number-average particle size is 3 to 1000 nm and [2] a non-crosslinked rubber component whose toluene-insolubles is less than 20% by weight, wherein said crosslinked rubber particle component is at least one selected from (1) a polymer comprising a conjugated diene unit and a monomer unit having at least two polymerizable unsaturated groups as repeating units, (2) a polymer comprising a conjugated diene unit, an α,β-unsaturated nitrile unit and a monomer unit having at least two polymerizable unsaturated groups as repeating units and (3) a polymer comprising a conjugated diene unit, an acrylate unit and a monomer unit having at least two polymerizable unsaturated groups as repeating units, and, wherein said non-crosslinked rubber component is at least one selected from (a) a polymer comprising as a repeating unit only a conjugated diene unit, (b) a polymer comprising a conjugated diene unit and an aromatic vinyl unit as repeating units, (c) a polymer comprising a conjugated diene unit and an α,β-unsaturated nitrile unit as repeating units, (d) an acrylic rubber and (e) a polymer comprising an ethylene unit and an a-olefin unit having 3 to 12 carbon atoms as repeating units.

2. A rubber composition according to claim 1, wherein said conjugated diene forming said each conjugated diene unit composing said crosslinked rubber particle component and said conjugated diene forming said each conjugated diene unit composing said non-crosslinked rubber component are each at least one selected from the group consisting of 1,3-butadiene, 2,3-dimethyl-1,3-butadiene, isoprene and chloroprene;

said aromatic vinyl forming said aromatic vinyl unit composing said non-crosslinked rubber component are each at least one selected from the group consisting of styrene, 2-methylstyrene, 3-methylstyrene, 4-methylstyrene, α-methylstyrene, 2,4- dimethylstyrene, 2,4-diisopropylstyrene, 4-tert-butylstyrene and tert-butoxystyrene;

said monomer forming said monomer unit having at least two polymerizable unsaturated groups composing said crosslinked rubber particle component is at least one selected from the group consisting of ethylene glycol di(meth)acrylate, propylene glycol di(meth)acrylate, 1,4-butanediol di(meth)acrylate, 1,6-hexanediol di(meth)acrylate, trimethylolpropane di(meth)acrylate, trimethylolpropane tri(meth)acrylate, pentaerythritol tri(meth)acrylate, pentaerythritol tetra(meth)acrylate, divinylbenzene, diisopropenylbenzene and trivinylbenzene; and, said monomer forming said α,β-unsaturated nitrile unit composing said crosslinked rubber particle component or a monomer forming said α,β-unsaturated nitrile unit composing said non-crosslinked rubber component is at least one selected from the group consisting of acryionitrile and methacrylonitrile.

3. A rubber composition according to claim 2, wherein at least a part of said crosslinked rubber particle component comprises as a repeating unit 0.1 to 30% by weight of a monomer unit having one polymerizable unsaturated group and at least one functional group selected from an amino group, a hydroxyl group, an epoxy group and a carboxylic group ($CO_2H$ and/or $CO_2^-$).

4. A rubber composition according to claim 2, wherein at least a part of said non-crosslinked rubber component comprises as a repeating unit 0.1 to 30% by weight of a monomer unit-having one polymerizable unsaturated group and at least one functional group selected from the group consisting of an amino group, a hydroxyl group, an epoxy group, a carboxylic group ($CO_2H$ and/or $CO_2^-$) and an alkoxysilyl group.

5. A rubber composition according to claim 1, wherein the amount of the crosslinked rubber component is 1 to 70 parts by weight based on 100 parts by weight as the total amount of said crosslinked rubber particle and said non-crosslinked rubber component.

6. A rubber composition according to claim 2, further comprising at least one selected from the group consisting of a silica and a carbon black.

7. A rubber composition according to claim 6, comprising said silica but not comprising said carbon black, wherein the amount of the silica is 2 to 120 parts by weight based on 100 parts by weight as the total amount of said crosslinked rubber particle and said non-crosslinked rubber component.

8. A rubber composition according to claim 7, further comprising a silane coupling agent.

9. A rubber composition according to claim 6, comprising said silica and said carbon black, wherein the total amount of the silica and the carbon black is 10 to 120 parts by weight as the total amount of the crosslinked rubber particle and said non-crosslinked rubber component.

10. A rubber composition according to claim 9, further comprising a silane coupling agent.

11. A rubber composition according to claim 1, further comprising a mineral oil-based softener.

12. A rubber composition according to claim 11, wherein said conjugated diene forming said each conjugated diene unit composing said crosslinked rubber particle component and a conjugated diene forming said each conjugated diene unit composing said non-crosslinked rubber component are each at least one selected from the group consisting of 1,3-butadiene, 2,3-dimethyl-1,3-butadiene, isoprene and chloroprene;

said aromatic vinyl forming said aromatic vinyl unit composing said non-crosslinked rubber component are each at least one selected from the group consisting of styrene, 2-methylstyrene, 3-methylstyrene, 4-methylstyrene, α-methylstyrene, 2,4-dimethylstyrene, 2,4-diisopropylstyrene, 4-tert-butylstyrene and 4-tert-butoxystyrene;

said monomer forming said monomer unit having at least two polymerizable unsaturated groups composing said crosslinked rubber particle component is at least one selected from the group consisting of ethylene glycol di(meth)acrylate, propylene glycol di(meth)acrylate, 1,4-butanediol di(meth)acrylate, 1,6-hexanediol di(meth)acrylate, trimethylolpropane di(meth)acrylate, trimethylolpropane tri(meth)acrylate, pentaerythritol tri(meth)acrylate, pentaerythritol tetra(meth)acrylate, divinylbenzene, diisopropenylbenzene and trivinylbenzene; and, said monomer forming said α,β-unsaturated nitrile unit composing said crosslinked rubber particle component or a monomer forming said α,β-unsaturated nitrile unit composing said non-crosslinked rubber component is at least one selected from the group consisting of acrylonitrile and metacrylonitrile.

13. A rubber composition according to claim 12, wherein at least a part of said crosslinked rubber particle component comprises as a repeating unit 0.1 to 30% by weight of a monomer unit having one polymerizable unsaturated group and at least one functional group selected from an amino group, a hydroxyl group, an epoxy group and a carboxylic group ($CO_2H$ and/or $CO_2^-$).

14. A rubber composition according to claim 12, wherein at least a part of said non-crosslinked rubber component comprises as a repeating unit 0.1 to 30% by weight of a monomer unit having one polymerizable unsaturated group and at least one functional group selected from the group consisting of an amino group, a hydroxyl group, an epoxy group, a carboxylic group ($CO_2H$ and/or $CO_2^-$) and an alkoxysilyl group.

15. A rubber composition according to claim 11, wherein the amount of the crosslinked rubber component is 1 to 70 parts by weight based on 100 parts by weight as the total amount of said crosslinked rubber particle and said non-crosslinked rubber component.

16. A rubber composition according to claims 12, further comprising at least one selected from a silica and a carbon black.

17. A rubber composition according to claim 16, comprising said silica but not comprising said carbon black, wherein the amount of the silica is 2 to 120 parts by weight based on 100 parts by weight as the total amount of said crosslinked rubber particle and said non-crosslinked rubber component.

18. A rubber composition according to claim 17, further comprising a silane coupling agent.

19. A rubber composition according to claim 16, comprising said silica and said carbon black, wherein the total amount of the silica and the carbon black is 10 to 120 parts by weight as the total amount of the crosslinked rubber particle and said non-crosslinked rubber component.

20. A rubber composition according to claim 19, further comprising a silane coupling agent.

* * * * *